United States Patent Office 3,037,909
Patented June 5, 1962

3,037,909
1-METHYL-5-NITROIMIDAZOLE FOR ENTEROHEPATITIS
Edward F. Rogers, Middletown, and Arsenio A. Pessolano, Colonia, N.J., assignors to Merck & Co., Inc., Rahway, N.J., a corporation of New Jersey
No Drawing. Filed June 29, 1960, Ser. No. 39,716
7 Claims. (Cl. 167—53.1)

This invention relates generally to compositions useful in the veterinary field. More particularly, it relates to compositions useful in the treatment of turkey blackhead disease and with methods of employing such compositions. Still more specifically, it is concerned with veterinary compositions containing 1-methyl-5-nitroimidazole and with the method of treating turkey blackhead with this compound.

Turkey blackhead (enterohepatitis) is an extremely destructive disease occurring in turkey flocks. It is caused by the organism *Histomonas meleagridis*. This organism, which is found in the droppings of the turkeys, is harbored in the egg of the cecal worm *Heterakis gallinae*. The blackhead disease is established when the cecal worm egg is ingested by the turkeys. The mortality rate in infected flocks is often 80% or higher so that the disease is a serious economic problem to the turkey grower.

The search for chemical compounds effective against enterohepatitis has continued for many years, and some useful substances have been discovered. The products heretofore available for controlling blackhead disease in turkeys have been of benefit but are not the final answer to control of the disease because unwanted side effects are frequently observed at the optimum dose level, and because of resistance development by the *Histomonas meleagridis* organism.

According to the present invention, it has now been found that 1-methyl-5-nitroimidazole and non-toxic acid addition salts thereof possess an unexpectedly high degree of activity against turkey blackhead disease when administered to the birds at low concentrations in the diet. It has further been discovered that the compound is substantially free of toxic side effects when fed at the effective dose levels. It is, consequently, an object of this invention to provide a method of treating blackhead disease with 1-methyl-5-nitroimidazole. An additional object is the use of acid addition salts of 1-methyl-5-nitroimidazole in treating turkey blackhead. It is a further object to provide compositions containing 1-methyl-5-nitroimidazole or its salts as an anti-blackhead ingredient. Further objects will be apparent from the following description of the invention.

We have found that 1-methyl-5-nitroimidazole effectively controls enterohepatitis when administered to turkeys at levels of from about 0.005% to about 0.075% by weight of the diet. The preferred concentration will, of course, depend to some extent upon the age of the birds and then severity of the infection. In most cases, we prefer to employ a turkey ration containing from about 0.01% to about 0.05% by weight of the drug. When 1-methyl-5-nitroimidazole is employed in the above concentrations, effective control of the disease is obtained with substantially no undesirable side effects or retardation of growth of the turkeys.

In some cases it may be more convenient to employ an acid addition salt of 1-methyl-5-nitroimidazole rather than the free base. For this purpose any salt that is non-toxic for the poultry is satisfactory, typical examples of which are mineral acid salts such as the hydrochloride, hydrobromide, sulfate, nitrate and the like, or organic salts such as the acetate, embonate or picrate. The dose levels referred to previously are for the free base, so that suitable adjustment in the preferred treatment level may be necessary when using a salt if the particular salt differs substantially from the free base in molecular weight. The salts are readily prepared by techniques known in the chemical art, such as by intimately contacting an organic solvent solution of the base with excess acid.

The imidazole compound is normally administered to the turkeys intimately mixed in an element of turkey sustenance such as the feed or the drinking water. When the infection is a severe one, it is preferred to add the compound to the drinking water (as a water-soluble powder or suspension) since the birds will continue to drink after they have stopped eating solid food. In those cases wherein the turkey feed is employed as the vehicle for the 1-methyl-5-nitroimidazole, it is desirable that the drug be mixed uniformly throughout the feed. This is accomplished by preparing a premix or feed supplement wherein the 1-methyl-5-nitroimidazole is present in concentrations of from about 1% to about 40% by weight and where the carrier or diluent is preferably a grain carrier such as wheat middlings, corn distillers' dried grains, wheat shorts and the like. Any non-toxic orally ingestible carrier may, of course, be used. These feed supplements are then uniformly mixed throughout the turkey ration by conventional techniques such as milling.

The following example is given for the purpose of illustration and not by way of limitation:

EXAMPLE 1

Day-old straight run Beltsville white turkey poults were reared in electrically heated battery-brooders and fed an open formula of commercial turkey starter ration and water ad lib. Enterohepatitis was induced with cecal worm infections by orally inoculating the poults (at two weeks of age) with approximately 200 embryonated *Heterakis gallinae* ova. Three days after infection, the birds were fed a medicated ration containing graded concentrations of 1-methyl-5-nitroimidazole. Feeding of the medicated ration was continued for 18 days and the surviving turkeys were then sacrificed and examined for pathological lesions characteristic of infectious enterohepatitis. The presence and severity of the lesions were scored as follows: 0=normal, 1=minimal detectable and 4=maximal. Other criteria used for assessing the extent of disease in the untreated controls and in the treated turkeys were the incidence of infection, mortality rate and relative growth rates.

The results of experiments in which infected turkeys were fed various concentrations of 1-methyl-5-nitroimidazole are set forth in the following table:

*Table I*

| Percent In Feed | Mean Wt. (Gms.) | | Mortality | | Mean Lesion Score | | Infection | |
|---|---|---|---|---|---|---|---|---|
| | Initial | Terminal | No./Total | Percent | Ceca | Liver | No. Total | Percent |
| 0.006 | 233 | 675 | 4/20 | 20 | 1.5 | 1.0 | 11/20 | 55 |
| 0.0125 | 233 | 710 | 0/34 | 0 | 0.3 | 0.0 | 8/34 | 24 |
| 0.025 | 234 | 683 | 0/22 | 0 | 0.5 | 0.0 | 7/22 | 34 |
| 0.05 | 236 | 531 | 0/13 | 0 | 0.0 | 0.0 | 0/13 | 0 |
| Infected Controls | 237 | 647 | 73/93 | 79 | 3.7 | 3.3 | 89/93 | 96 |
| Uninfected Controls | 214 | 754 | 0/19 | 0 | 0.0 | 0.0 | 0/19 | 0 |

Any departure from the above description which conforms to the present invention is intended to be included within the scope of the claims.

What is claimed is:

1. A composition for treatment and prevention of turkey blackhead that comprises turkey feed having intimately mixed therein from about 0.005% to about 0.075% by weight of 1-methyl-5-nitroimidazole.

2. A composition for treatment and prevention of turkey blackhead that comprises an element of turkey sustenance having intimately mixed therein from about 0.006% to about 0.075% by weight of a member of the class consisting of 1-methyl-5-nitroimidazole and non-toxic acid addition salts thereof.

3. A composition for treatment and prevention of turkey blackhead that comprises an element of turkey sustenance having intimately mixed therein from about 0.01% to about 0.05% by weight of 1-methyl-5-nitroimidazole.

4. A composition useful in the treatment of turkey blackhead that comprises a grain carrier having dispersed therein as an active ingredient a member of the class consisting of 1-methyl-5-nitroimidazole and non-toxic acid addition salts thereof.

5. A composition useful in the treatment of turkey blackhead that comprises a grain carrier having dispersed therein as an active ingredient from about 1% to 40% by weight of 1-methyl-5-nitroimidazole.

6. The method of combatting turkey blackhead that comprises orally administering an effective, non-toxic dose of 1-methyl-5-nitroimidazole to turkeys susceptible to turkey blackhead infection.

7. The method of combatting turkey blackhead that comprises orally administering to turkeys susceptible to turkey blackhead an element of turkey sustenance having intimately mixed therein from about 0.006% to about 0.075% by weight of a member of the class consisting of 1-methyl-5-nitroimidazole and non-toxic acid addition salts thereof.

References Cited in the file of this patent

Lehmstedt: Chem. Abst., 28, p. 767(8), 1934.
Yearbook of Agriculture, Animal Diseases, USDA, 1956, Washington, D.C., p. 441.